US005465614A

United States Patent [19]

Fournier

[11] Patent Number: 5,465,614

[45] Date of Patent: Nov. 14, 1995

[54] APPARATUS AND METHOD FOR NON-INTRUSIVE TESTING OF A MOTOR VEHICLE CANISTER PURGE SYSTEM

[75] Inventor: Thomas J. Fournier, Tucson, Ariz.

[73] Assignee: Envirotest Systems Corp., Tucson, Ariz.

[21] Appl. No.: 218,281

[22] Filed: Mar. 28, 1994

[51] Int. Cl.[6] .................................................. G01M 15/00

[52] U.S. Cl. ...................... 73/118.1; 73/118.2; 73/119 A

[58] Field of Search .............................. 73/118.1, 118.2, 73/119 A

[56] References Cited

U.S. PATENT DOCUMENTS

| | | | |
|---|---|---|---|
| 4,027,536 | 6/1977 | Heggie | 73/119 A |
| 4,187,720 | 2/1980 | Baker | 73/119 A |
| 4,216,403 | 8/1980 | Krempl et al. | 73/119 A |
| 4,321,833 | 3/1982 | Zeiringer | 73/119 A |
| 4,391,147 | 7/1983 | Krempl et al. | 73/119 A |
| 5,115,672 | 5/1992 | McShane et al. | 73/119 A |
| 5,150,689 | 9/1992 | Yano et al. | 73/118.1 |
| 5,251,477 | 10/1993 | Nakashima et al. | 73/118.1 |
| 5,284,050 | 2/1994 | Iida et al. | 73/118.1 |

*Primary Examiner*—Richard Chilcot
*Assistant Examiner*—Eric S. McCall
*Attorney, Agent, or Firm*—Lothrop & West

[57] ABSTRACT

An apparatus and method for non-intrusive testing of the rate and total amount of vapor flow through the canister purge line in a motor vehicle. The apparatus includes a clamping structure, adapted for temporary attachment to the purge line leading from the evaporative canister to the engine's intake manifold. A vapor flow sensing system is provided within the structure. Both thermal loss and acoustical phase shift detection based sensing systems are disclosed herein. An operator secures the clamp over any portion of the purge line, and the vehicle's engine is put through a driving test cycle. The output of the sensing system is displayed, recorded, and integrated, for a subsequent pass/fail determination using predetermined vapor flow values.

7 Claims, 3 Drawing Sheets

Thermal Loss System

Sonic Phase Shift System

APPARATUS AND METHOD FOR NON-INTRUSIVE TESTING OF A MOTOR VEHICLE CANISTER PURGE SYSTEM

FIELD OF THE INVENTION

The invention relates generally to the art of devices and methods for testing purge flow rates from an evaporative charcoal canister in a motor vehicle. More specifically, the invention pertains to a non-intrusive instrument specifically adapted to measure the rate of vapor flow in the purge line leading from the canister to the engine's fuel intake system. By non-intrusive, it is meant that measurement of the vapor flow rate during purging can be made without disconnecting any portion of the fuel vapor purge line or its associated hardware.

BACKGROUND OF THE INVENTION

Motor vehicles are subjected to wide variations in temperature and air pressure, both while in use and when parked. Elevated temperatures and reduced air pressures, in particular, result in the generation of hydrocarbon vapors within the vapor space of the vehicle's fuel tank. Modern motor vehicles include a gas cap adapted to seal the open end of the tank filler neck, to prevent atmospheric venting of these polluting vapors. Such vehicles also are equipped with a charcoal canister, having an inlet interconnected to the vapor space in the upper portion of the fuel tank, by means of a vapor vent line. The outlet of the canister is interconnected to the engine's air/fuel intake system, such as the intake manifold, or the like.

The function of the charcoal canister is to absorb excessive gasoline vapors generated during high temperature and/or low ambient pressure conditions, while simultaneously avoiding a dangerous vapor pressure buildup in the fuel tank. Thus, in a proper functioning evaporative system, when pressure in the vapor space exceeds atmospheric pressure, fuel vapors migrate through the vapor vent line into the vehicle's canister, where the hydrocarbons are absorbed by the charcoal. If vapor pressure is sufficient, the filtered vapor is safely exhausted to the atmosphere through an air vent in bottom of the canister.

Then, during driving, the vacuum existing in the intake manifold draws fresh air in through the same vent, vaporizing the hydrocarbons. The gas vapor is drawn by vacuum through the purge line, and introduced into the intake manifold for combustion. In this manner, the gasoline is fully utilized, and the charcoal canister is fully purged of vapors, restoring its hydrocarbon storage capacity for the next cycle.

If the charcoal canister is not regularly purged while the vehicle is driven, the charcoal will eventually become saturated and the trapped hydrocarbons will escape directly into the atmosphere through the canister's air vent. When this occurs, the major advantages provided by the evaporative system are defeated. The negative environmental impact of uncontrolled vapor discharge through the canister rivals that of the vehicle's exhaust emissions. Moreover, this vapor emission also decreases the overall fuel economy of the vehicle, by venting hydrocarbons which would otherwise be burned in the engine. Consequently, proper purging of the canister has significance both for the environment and for the conservation of energy.

In recognition of these facts, the Federal Environmental Agency (EPA), has mandated the testing of this canister purging function, in the context of a more comprehensive vehicle inspection and maintenance testing procedure, known as the "I/M 240" test. In the course of this 240 second test, a vehicle is put through a predetermined driving cycle on a dynamometer, simulating vehicle performance at various speeds and during acceleration/deceleration conditions. While being so tested, the purge line leading from the canister to the engine is constantly monitored, using a sensor and a recording instrument. This confirms that at some point during the predetermined driving test cycle, an adequate purging event has occurred.

The prior art includes an intrusive testing technique, requiring the temporary, mechanical connection of a flow transducer in series with the purge line leading from the canister to the intake manifold. Typically, this involves locating the canister, and disconnecting the purge line from the canister. After installing the transducer, flow measurements are monitored by a display and recording unit to determine operational effectiveness of the purge cycle. After the test is completed, the process is reversed, removing the transducer and restoring the purge line to its original connection.

This intrusive approach has a number of significant drawbacks. Some vehicles have inaccessible canisters, and cannot be tested with this method. Locating the canister, removing the purge line, installing the transducer, removing the transducer, and finally reconnecting the purge line, all take a significant amount of time for the testing personnel to complete. Lastly, removing purge lines and fittings on older vehicles and on vehicles having nearly inaccessible canister locations, can result in damage to these components.

The prior art also includes a non-intrusive testing method, employing a tracer gas. This system contemplates the removal of the fuel tank filler cap and the connection of a gas pressurization and metering device to the filler neck opening. For example, U.S. Pat. No. 5,239,858, issued to Rogers et al., shows the connection of a helium cylinder and a flow meter to a motor vehicle fuel evaporative system, using a connector cap on the filler neck.

SUMMARY OF THE INVENTION

The present invention includes a detector, or sensor housing, provided with a clamping structure for temporarily engaging the canister purge line of a motor vehicle under test. The clamping structure has an accessible recess or opening, configured and sized generally to correspond to the exterior shape and dimensions of the purge line. A snug and secure attachment between the housing and the exterior wall of the purge line are thereby assured.

In a preferred embodiment, the housing includes clamshell-like upper and lower halves, hingeably attached to each other and spring biased into a closed position. Abutting faces of these halves include adjacent, complementary cutouts or grooves which together surround and accommodate a selected section of the purge line. Such a construction allows the housing to be quickly and easily clamp-installed, along any accessible portion of the purge line.

The grooved portion of the housing includes a sensing system, designed to detect the passage of gaseous vapors through the purge line. Two different sensing systems are disclosed herein. The first system uses at least one heating element and a temperature sensor, to measure temperature variations in the exterior sidewall of the purge line, attributable to passing vapors. The second relies upon a pair of transducers to detect a phase shift in audio frequency waves, impressed upon and reflected by the passing vapors.

Each sensor system also includes associated control, measurement, and recording components to monitor and store collected data regarding vapor flow rates. These components are preferably housed in a separate console, located adjacent the vehicle under test, and are connected to the sensor housing by means of cable. This console may also include digital memory components, storing predetermined flow rate values which are appropriate for the vehicle under test. In this manner, canister purge pass/fail determinations may be made while the vehicle is subjected to a driving test on a dynamometer.

DETAILED DESCRIPTION OF THE PREFERRED EMBODIMENT

Figure 1:
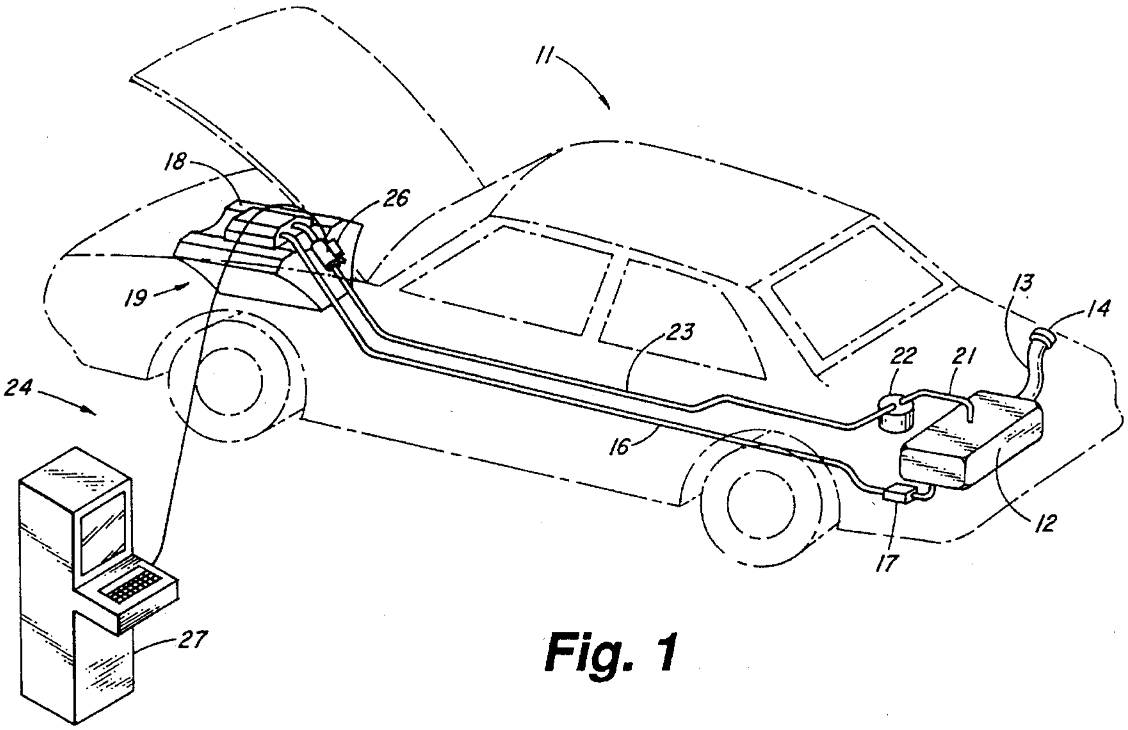
FIG. 1 is a schematic representation of a vehicle under test, showing the evaporative canister, the fuel tank, the engine, the sensor housing, and the test console.

Turning now to FIG. 1, the outline of a motor vehicle 11 under test, is shown in broken line. Vehicle 11 includes a fuel tank 12, having a filler neck 13 and a neck sealing cap 14. A main fuel line 16 leads from the bottom of tank 12, through a pump 17, to the intake manifold 18 of engine 19. A vapor vent line 21 extends from the top portion of tank 12, to the inlet side of charcoal canister 22. A canister purge line 23 leads from the outlet side of the canister 22 to intake manifold 18.

Figure 2:
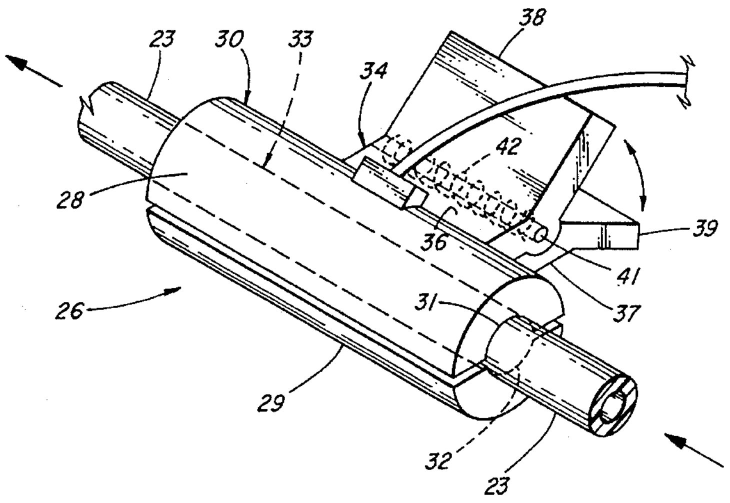
FIG. 2 is an enlarged view of a typical sensor housing, shown clamped upon a fragmentary section of purge line.

The canister purge testing apparatus of the present invention is generally designated by the numeral 24, and includes a detector or sensor housing 26 and an operator's console 27. FIG. 2 shows a typical sensor housing 26 in more detail, installed on a section of purge line 23. In the preferred embodiment disclosed herein, housing 26 includes a purge line clamp 30 with clamshell-like upper half 28 and lower half 29. Abutting faces of halves 28 and 29 include complementary, elongated arcuate cutouts 31 and 32 defining an opening or recess 33 extending through clamp 30. Recess 33 is sized and configured so as to accommodate in tight relation, a selected segment of the purge line.

Clamp extension 34 includes a pair of plates 36 and 37, projecting, respectively, from half 28 and half 29. Plates 36 and 37 also include diverging finger grips 38 and 39. As is best shown in FIG. 2, a pin 41 hingeably interconnects proximate sides of the clamp 30; also, a spring 42 extends substantially the length of pin 41, and biases the distal sides of clamp 30 together.

It will be appreciated, then, that by squeezing grips 38 and 39 together, the distal sides of the clamp will temporarily be spread apart, facilitating installation of clamp 30 over purge line 23. Then, by releasing grips 38 and 39, clamp is spring biased into a closed position, with recess 33 snugly surrounding line 23. One of the major advantages provided by the present invention is that the clamp may be installed in a non-intrusive manner, over any accessible section of the purge line between the canister and the engine. No disassembly whatsoever of the purge line is required.

It is contemplated that housing 26 could alternatively include an appropriately configured elongated recess in an exterior sidewall, for accommodating the purge line. For example, if the material of the housing around the recess were rubber or another resilient material, the purge line could merely be press fitted into the recess, without the necessity of a clamshell-like clamping arrangement. Another alternative to the clamshell clamp would involve the use of VELCRO strapping material, or the like, which would temporarily secure the purge line against the detection components within the sensor housing.

Figure 3:
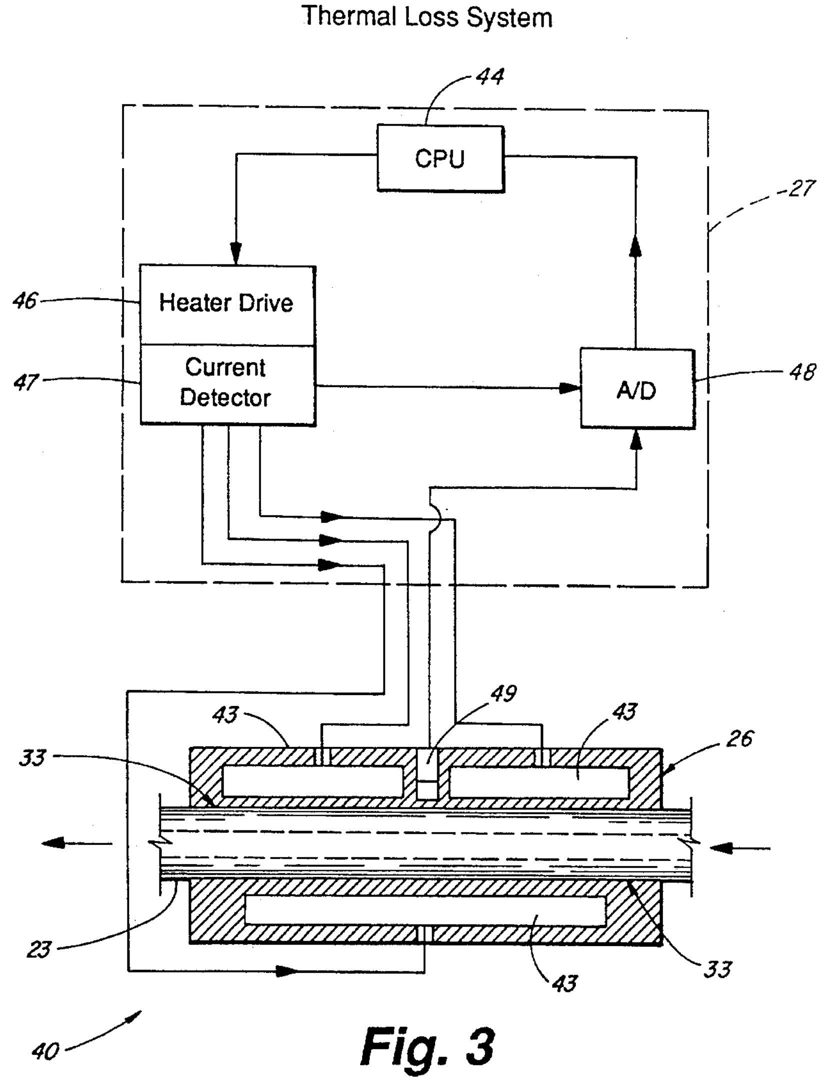
FIG. 3 is a schematic representation of a thermal loss sensor system, including a cross-sectional view of the associated sensor housing.

In FIG. 3, a first vapor flow sensor system 40 is disclosed, based upon principles of thermal loss induced by vapor flow. This system employs at least one heating element and at least one temperature sensing element, typically a thermistor. In the preferred embodiment, a number of electrical heaters 43 are strategically located completely around and along the recess 33 within the housing 26. This arrangement is preferred because it effectively raises the temperature of the purge line to a control temperature well above ambient temperature, approximately 200 degrees Fahrenheit. To that end, a microprocessor 44, a heater driver 46, a current detector 47, an analog-to-digital converter 48, and a thermistor 49 are provided. The dashed line identified by numeral 27 indicates which of these components are located on the console.

Under preliminary start-up conditions, when there is no vapor flow, the heaters 43 are servo-controlled by the interaction of the just recited components to raise the hose temperature to the control temperature. The microprocessor 44 continuously samples the output of the thermistor 49 to determine the temperature in the near vicinity of the hose. When the control temperature is reached, the microprocessor appropriately controls the heaters to maintain that temperature.

Upon initiation of the vehicle test, the engine is started and the operator may be called upon to perform a specified driving cycle, for a predetermined period of time. During this cycle, the vehicle may be accelerated to a certain speed, held at a constant speed, or decelerated to a stop, all at specified rates and for predetermined periods of time, selected to simulate actual driving conditions. It is during this test cycle, that the invention herein is to monitor vapor flow within the purge line and confirm that the canister is adequately purged of hydrocarbons.

As the engine is put through this cycle, fuel vapor will begin to flow from the canister 22 to the intake manifold 18, if the vehicle's purge system is working properly. When this occurs, the fuel vapor carries heat away from the inner surface of the purge line 23, and this changed condition is detected by the thermistor 49. This information is delivered to the microprocessor 44, which increases the amount of power passed on to the heaters 43 to maintain the control point temperature.

Figure 4:
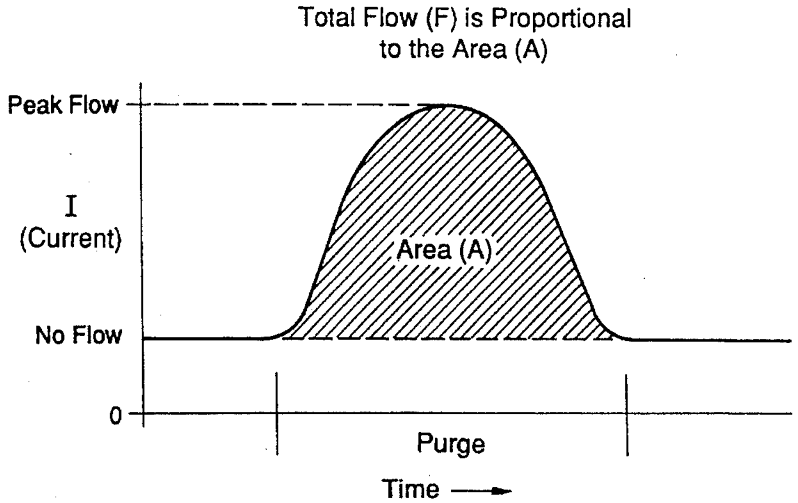
FIG. 4 is a graph depicting the calculation of the total flow of vapor through the purge line over a period of time, by integrating the function of current flowing through a heating element in the sensor housing.

FIG. 4 shows the current ("I") delivered to the heaters as a function of time, during an actual purge cycle. During a "no flow" condition, the heater current is substantially constant, as the control point is maintained. With increasing vapor flow, the current necessary to maintain the control point temperature increases proportionately. By integrating the difference between the current required to maintain a constant temperature during "no flow", and the instantaneous current provided during flow conditions, a value ("A"), which is proportional to the total purge flow ("F") during the test, can be determined. This value may then be compared to predetermined values for the vehicle under test, to make a pass/fail determination.

Figure 5:
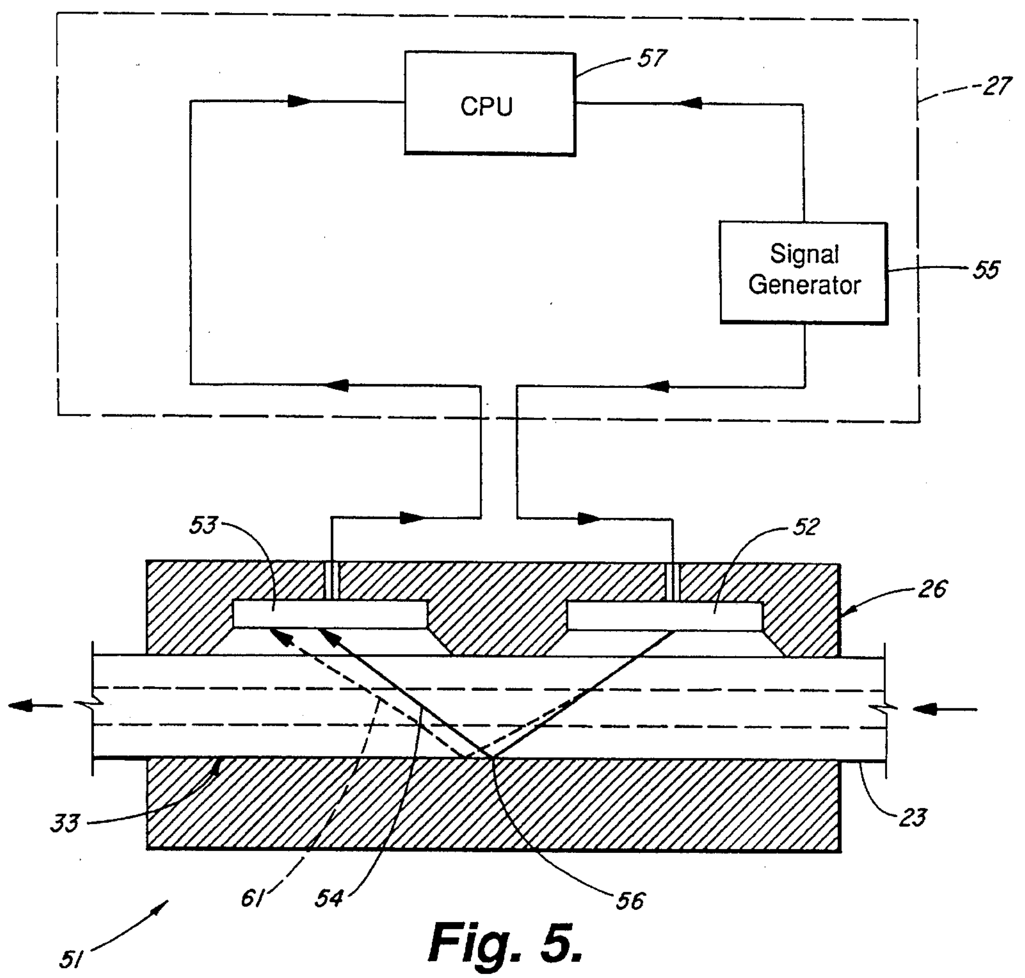
FIG. 5 is a schematic representation of an acoustic, or sonic phase sensor system, including a cross-sectional view of the associated sensor housing.

Turning now to FIG. 5, a second vapor flow sensing system 51 is disclosed. The operating principle of system 51 depends upon a phase shift induced in acoustical waves, passing through the purge line. For that purpose, a high frequency acoustic transducer, or transmitter 52 is located within the upstream portion of sensor housing 26, directed generally toward the sidewall of purge line 23. Similarly, a high frequency transducer, or receiver 53 is located within the downstream portion of housing 26, also directed toward line 23. Conventional acoustic wave directive components (not shown) may be used on both transmitter 52 and receiver 53, to focus the transmission and reception of the sonic wave path 54, improving the overall signal to noise ratio of the system.

Under "no flow" conditions, transmitter 52 radiates a sine wave, produced by signal generator 55, preferably operating at an audio frequency. The acoustical wave readily passes through the line 23 before it encounters the relatively rigid wall of recess 33, at reflection point 56. Bouncing off point 56, the wave is redirected toward the receiver 53, passing again through the line 23. The wave is detected by receiver 53, and the output signal is fed to a microprocessor 57. The output of generator 55 is also delivered to microprocessor 57, which notes the phase relationship between the two signals. This step initially establishes a "no flow" reference signal 58, depicting the phase relationship between the transmitted and received signals (see FIG. 6).

Figure 6:
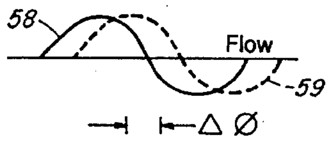
FIG. 6 is a graph depicting the phase shift in the detected sound wave, induced by a fixed vapor flow rate.
Figure 7:
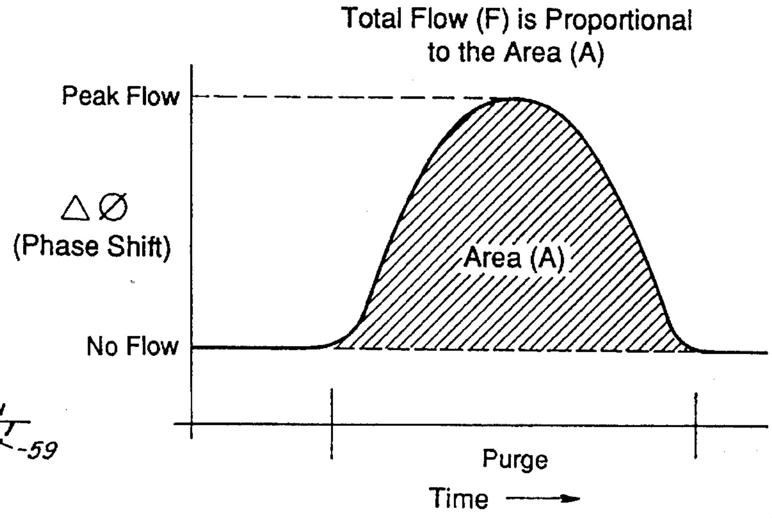
FIG. 7 is a graph showing the calculation of the total flow of vapor through the purge line over a period of time, by integrating the function of phase shift in the sound wave detected in the sensor housing.

Under vapor flow conditions, the acoustical wave is physically displaced downstream by the passing vapor, both before and after bouncing off reflection point 56. This displaced wave 61, arrives at receiver 53 later than the no signal wave 54. The resultant electrical signal 59 is shown in FIG. 6, showing the phase shift or offset existing between the "no flow" and flow conditions.

The microprocessor 57 integrates the difference between the phase shift under "no flow" conditions and the instantaneous phase shift over the driving test cycle to determine a value ("A"). And, as with the thermal loss system described above, the value A is proportional to the total flow ("F"), so as to provide a useful measure of the total flow. This measured quantity, in turn, is compared to predetermined values for acceptable purge flow during the course of the driving cycle, and a pass/fail determination is made and displayed by console 27.

It will be appreciated, then, that I have disclosed an apparatus and a method for testing the canister purge system of a motor vehicle during the course of a driving cycle, without physically having to disassemble and reassemble the components of that system.

What is claimed is:

1. A non-intrusive apparatus for determining an instantaneous rate of vapor flow through a purge line leading from an evaporative canister to an air/fuel intake of an engine, comprising:

a. a sensor housing, having a portion adapted for engagement with an exterior of the purge line;

b. clamping means, for temporarily securing said housing to the purge line;

c. means within said portion for measuring a vapor flow rate in proportion to changes in a temperature of the engaged purge line, said measuring means including at least one heater and at least one temperature sensor downstream from said heater, said heater and said sensor being secured in conductive relationship with the purge line.

2. An apparatus as in claim 1 further including a current detector interconnected to said heater, a heater driver having an output directed to said current detector, a microprocessor having an output directed to said heater driver, and an analog to digital converter having inputs responsive to said current detector and said temperature sensor and an output directed to said microprocessor.

3. A non-intrusive apparatus for determining an instantaneous rate of vapor flow through a purge line leading from an evaporative canister to an air/fuel intake of an engine, comprising:

a. a sensor housing, having a portion adapted for engagement with an exterior wall of the purge line;

b. clamping means, for temporarily securing said portion to said wall;

c. means within said portion for measuring a vapor flow rate in proportion to a phase shift in an audio wave reflected from vapor passing through the purge line.

4. An apparatus as in claim 3 in which said measuring means includes a transmitting transducer and a receiving transducer arranged in spaced relation along the purge line.

5. An apparatus as in claim 4 further including a signal generator having an output-directed to said transmitting transducer, and a microprocessor responsive to said receiving transducer and said signal generator.

6. An apparatus as in claim 4 in which said transmitting transducer is upstream from said receiving transducer, and in which both said transducers are one side of the vapor line.

7. An apparatus as in claim 6 in which said housing includes reflective means between said transducers and on an opposite side of the vapor line from said transducers, for directing the audio wave from said transmitting transducer toward said receiving transducer.

* * * * *